G. W. MOORE.
STUFFING BOX.
APPLICATION FILED MAR. 28, 1912.

1,056,202.

Patented Mar. 18, 1913.

Witnesses

Inventor
George W. Moore
By
Attorney

UNITED STATES PATENT OFFICE.

GEORGE W. MOORE, OF TOTTENVILLE, NEW YORK.

STUFFING-BOX.

1,056,202. Specification of Letters Patent. Patented Mar. 18, 1913.

Application filed March 28, 1912. Serial No. 686,914.

*To all whom it may concern:*

Be it known that I, GEORGE W. MOORE, a citizen of the United States, residing at Tottenville, in the county of Richmond and State of New York, have invented certain new and useful Improvements in Stuffing-Boxes, of which the following is a specification.

This invention relates to stuffing boxes and is designed particularly to construct a device of this character, for use in connection with the propeller shaft of marine vessels.

In the stuffing box now in use, the rotation of the propeller shaft has, due to its position to the bearing surfaces thereof, worn a depression upon the lower side of the bearing, thus causing the rear terminal of the shaft to drop slightly and throw the entire shaft out of alinement.

It is the object of the present invention to eliminate this wear and to provide a stuffing or box which will retain the propeller shaft in direct alinement at all times and prevent any warping or bending thereof.

Among the other objects of the present invention is to provide a bearing or stuffing box which will be thoroughly lubricated at all times, in such a manner that leakage may be positively prevented, and all strains, etc., may be removed.

With the above and other objects in view, my invention consists in the construction, combination, and arrangements of parts, all as hereinafter more fully described, wherein:—

Figure 1:
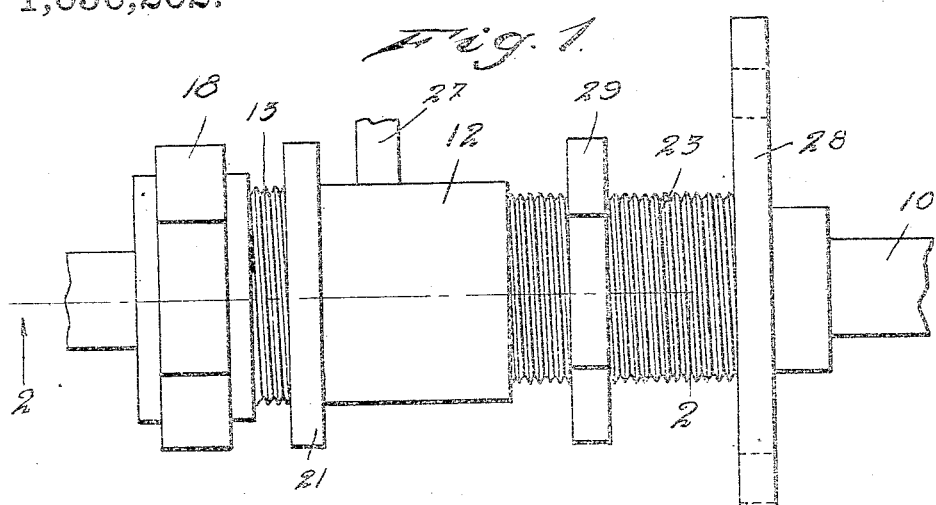
Figure 2:
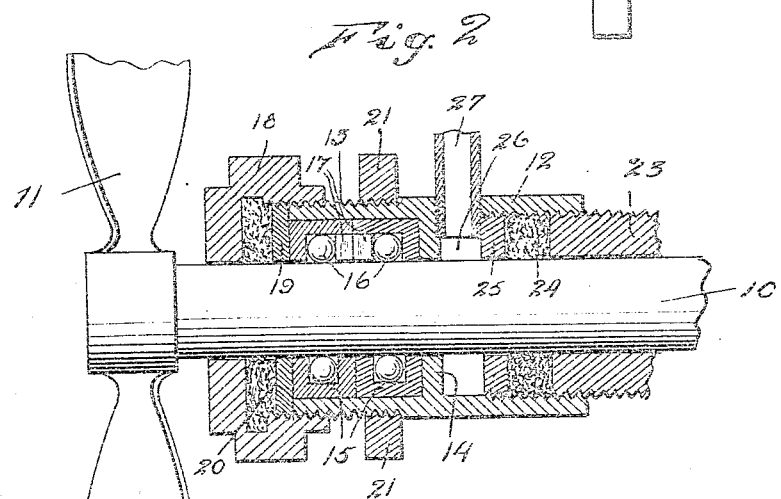
Figure 3:
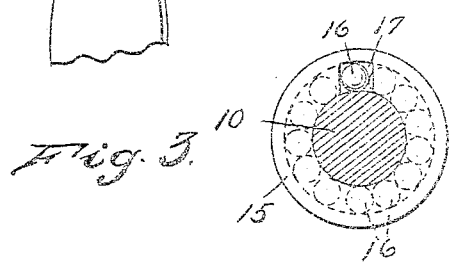

Figure 1 is a top plan elevation of a stuffing box constructed in accordance with the present invention. Fig. 2 is a central longitudinal section taken along line 2—2 of Fig. 1. Fig. 3 is an elevation of one of the ball races located within the stuffing box.

In carrying out the present invention, the propeller shaft is incased in a tubular bearing sleeve provided at its outer terminal with an exteriorly threaded tubular extension upon which is threaded a suitable coupling. A circular flange is located upon the interior of the sleeve adjacent to the inner terminal of the threaded extension and provides a bearing surface for the ball races which are mounted within said threaded extension. These ball races are retained in their operative position by a suitable washer or gasket threaded upon the interior of the coupling and operating against the terminal of said extension. Packing is mounted between said washer and the outer face of said coupling. The inner terminal of the bearing sleeve heretofore referred to is in threaded engagement with the exteriorly threaded nipple which projects through the hull of the boat. A washer is threaded into the rear terminal of said bearing sleeve and provides a means whereby packing may be retained adjacent to the terminal of said nipple within said sleeve.

Reference being had more particularly to the drawing, 10 indicates a suitable propeller shaft provided with any type of propeller 11 at its outer terminal. The bearing sleeve 12 incases the shaft 10 adjacent to the propeller 11 and upon the exterior of the boat to which the device is attached, said sleeve being interiorly threaded at the inner end thereof and provided with an exteriorly threaded extension 13 at the outer terminal thereof. An inwardly extending circular flange 14 is formed upon the interior of said sleeve 12, adjacent to the inner terminal of the exteriorly threaded extension 13, said flange constituting a washer in its function, the orifice thereof, being of greater diameter than the diameter of the shaft aforesaid, for the purpose of allowing the free circulation of a lubricant. Suitable ball races 15 are mounted upon the interior of the exteriorly threaded extension 13 and bear against the flange 14, said ball races having suitable ball bearings 16 mounted therein. The ball races 15 are U shaped in cross section to provide a channel for the operation of the ball bearings 16 but have one side of said U shaped channel cut away to form an opening 17, by means of which the balls may be removed when so desired.

A suitable coupling 18 is mounted upon the threaded extension 13 due to the interior threads formed upon said coupling. This coupling 18 has a washer 19 threaded therein which abuts against the outer terminal of the exteriorly threaded extension 13 and prevents any displacement of the ball races 15, and suitable packing material 20 is placed between the outer terminal of the coupling 18 and the washer 19 heretofore referred to. In order to jam the coupling 18 and to prevent any movement thereof, a suitable lock nut 21 is mounted for rotation upon the threaded extension 13, and when the entire device is in its operative position is adapted to contact with the inner terminal of said coupling and retain the same in a fixed position.

The inner terminal of the sleeve 12 is interiorly threaded as at 22 to receive the inner terminal of an exteriorly threaded nipple 23. This nipple is threaded partially into the interior of the sleeve 12 and operates against the packing ring 24. The inner side of said packing ring bears against a washer 25 threaded upon the interior of the sleeve 12, the opening in said washer being of a slightly greater diameter than the sleeve 10. The washer 25 is spaced from the flange 14 thereby forming a lubricant recess 26, which is fed by the pipe 27 leading to the interior of the boat.

A suitable bearing plate 28 is mounted upon the interior terminal of the nipple 23 and coöperates with a lock nut 29 to secure the entire device in its operative position.

It will be clearly understood from the foregoing that the pipe 27 keeps the lubricant chamber 26 constantly filled with lubricant, while the rotation of the shaft 10 causes said lubricant to be conveyed through the ball bearings into the packing 20, causing the same to be entirely saturated with the lubricant while a similar process conveys the lubricant to the packing ring 24.

Having thus fully described my invention, what I claim is new and desire to secure by U. S. Letters Patent, is:—

1. In a stuffing box, the combination with a shaft, of a sleeve surrounding said shaft and formed intermediate its ends with an inwardly projecting flange, a ball raceway surrounding said shaft and positioned within the sleeve, a plurality of bearing balls retained within said race-way by the shaft, and means surrounding said shaft and secured to one end of the sleeve, whereby the ball race-way is retained in position.

2. The combination with a shaft, of a stuffing box therefor, comprising a sleeve formed intermediate its ends with an inwardly projecting flange, apertured bearing disks loosely surrounding said shaft and fitting within the sleeve, said bearing disks being formed with race-ways, bearing balls positioned within said race-way and retained therein by said shaft, a coupling member secured to one end of said sleeve to retain the bearing disks therein, and means for supporting a stuffing box.

3. In a stuffing box for propeller shafts, the combination of a sleeve externally threaded adjacent one end and internally threaded adjacent the other end, an internal flange formed upon the sleeve intermediate its ends, apertured bearing disks adapted to surround a shaft, said disks being annularly grooved to form race-ways, ball bearings adapted to be retained in said race-ways by propeller shafts, an apertured cap member threaded upon the exterior of said sleeve to hold the race-ways therein, a washer threaded upon the interior of the sleeve and spaced from the flange thereof to form a lubricant chamber, a nipple threaded into the inner end of the sleeve, a packing interposed between said nipple and washer, and means whereby the lubricant may be conducted to the lubricant chamber.

In testimony whereof I affix my signature in presence of two witnesses.

GEORGE W. MOORE.

Witnesses:
G. W. DuBois,
Thomas N. Hawkins.

---

Copies of this patent may be obtained for five cents each, by addressing the "Commissioner of Patents, Washington, D. C."